May 31, 1927. 1,630,659
H. W. HACKER
IMPLEMENT FOR MARKING OBJECTS
Filed May 17, 1924   2 Sheets-Sheet 2
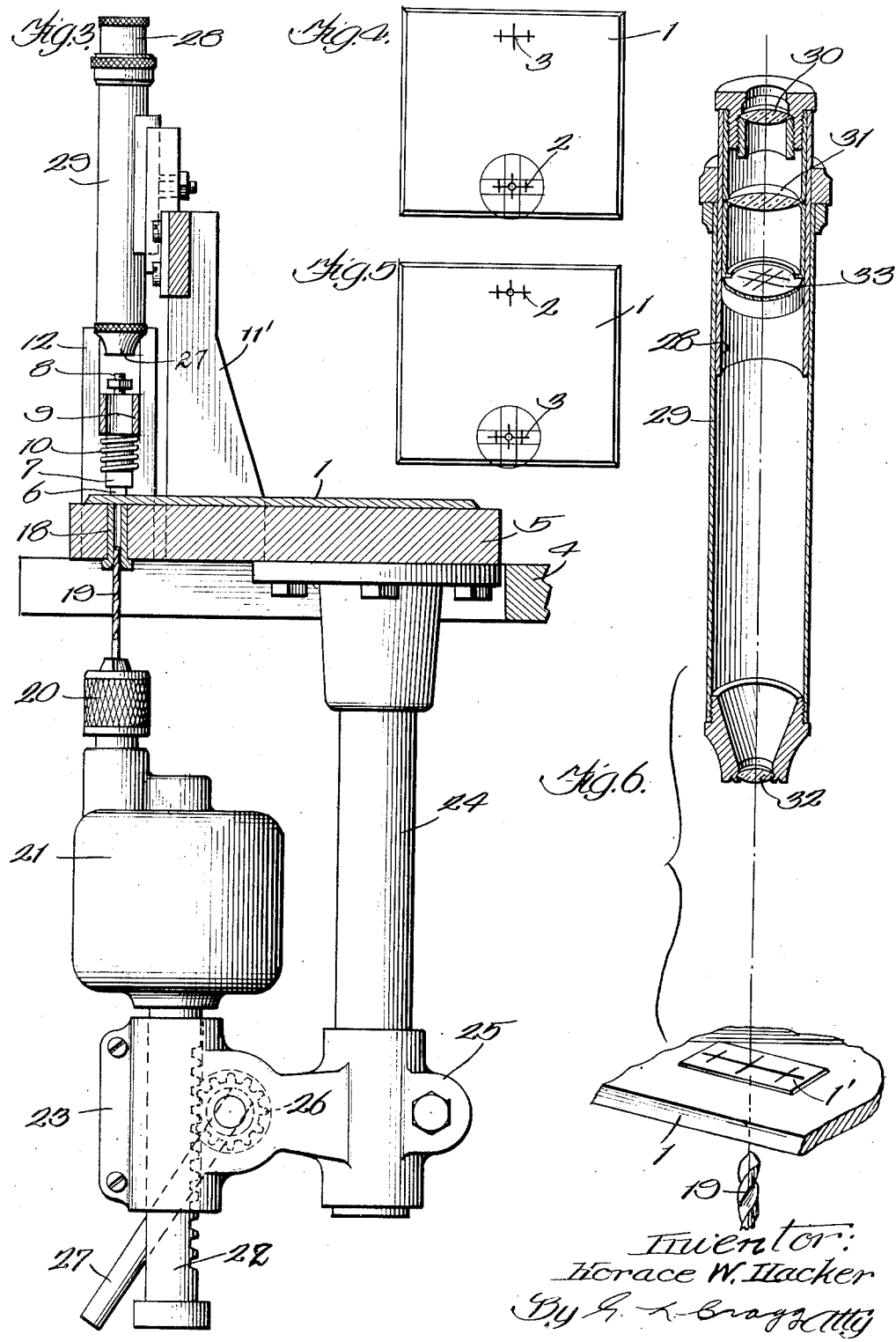
Inventor:
Horace W. Hacker Patented May 31, 1927.

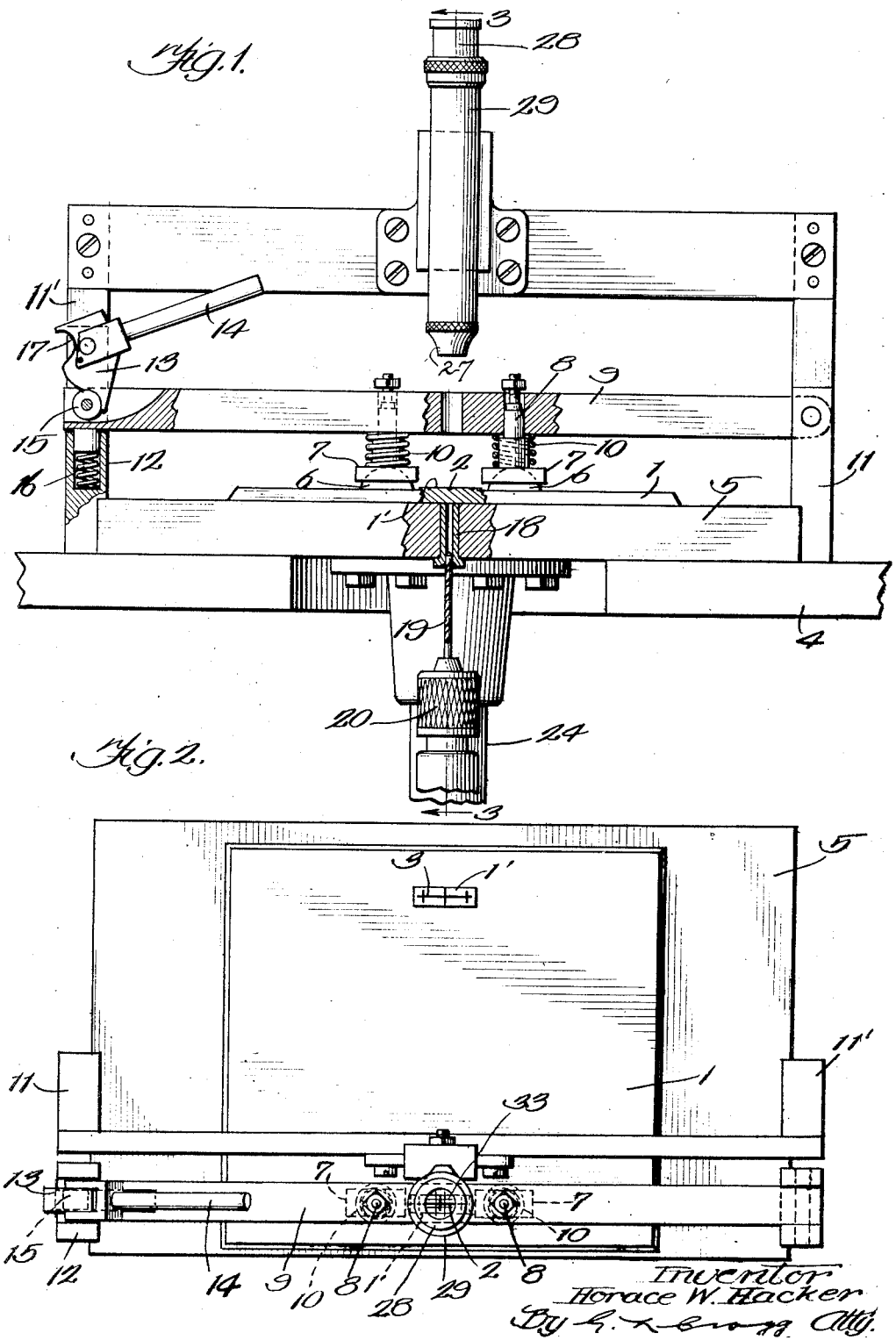

1,630,659

UNITED STATES PATENT OFFICE.

HORACE W. HACKER, OF CHICAGO, ILLINOIS, ASSIGNOR TO HACKER MANUFACTURING CO., OF CHICAGO, ILLINOIS, A CORPORATION OF ILLINOIS.

IMPLEMENT FOR MARKING OBJECTS.

Application filed May 17, 1924. Serial No. 714,023.

My invention relates to an apparatus for marking objects and is very usefully employed in providing a series of color printing plates with equally spaced marks in order that the plates may be successively imposed in exactly the same place upon a printing bed or form whereby the printing, in different colors, effected from said plates upon the same print, will be in exact register.

The marking implement of my invention includes a gauge in normally fixed relation with a marking element. The gauge is a sighting device and the marking element is preferably in the form of a drill. Either or both the mechanism for operating the drill and a guide for the drill has fixed relation with the gauge. The sighting gauge has a sight opening having a fixed alignment. The axis of the sighting gauge and drill are coincident at the printing surface of the plate that is being drilled. In the preferred embodiment of the invention, said opening or its axis is coincident with the axis of the operating drill throughout. In the preferred embodiment of the invention, the sighting gauge is in the form of a microscope having an index within it that is in line with the sighting opening and the axis of the operating drill. The plate to be drilled is shifted until an index upon the plate that marks or aids in determining the intended location for the hole through the plate is brought into line with the index and sighting opening of the gauge. If the gauge index and sighting opening are in the axis of the operating drill, as is preferred, the index upon the plate is, consequently, located in exact alignment with the drill which is in readiness to form the hole in the exact location of the index. The invention, however, is not to be limited to the preferred relationship of the drill and gauge.

The invention will be more fully explained in connection with the accompanying drawings in which Fig. 1 is a front view, with parts broken away and shown in section, of the preferred embodiment of my invention; Fig. 2 is a plan view of the structure shown in Fig. 1; Fig. 3 is a sectional view on line 3—3 of Fig. 1; Fig. 4 is a plan view of a suitably marked plate, diagrammatically illustrating the sighting device; Fig. 5 is similar to Fig. 4 but illustrating the plate reversed after the drilling of a hole at one side; and Fig. 6 is a perspective view of the preferred form of sighting device shown in longitudinal section, together with the drill and a plate diagrammatically illustrated.

The printing plates 1 that are to be drilled are provided with marks or indices 2, 3, thereon at each side of the plate, these indices being usually half tone reproductions of marks provided upon the original drawing or other copy. These indices are preferably upon raised portions 1' whose top surfaces are in the plane of the printing surface. There are as many such plates, so marked, as are required in a series for color printing, as will be understood. With the aid of the apparatus of my invention. holes are drilled through the indices 2, 3, for receiving pins upon a printing foundation upon which the plates are successively imposed for the successive printing operations, the impressions made by all plates upon each sheet being, therefor, in exact register. The indices upon the plates are preferably exactly defined by the intersections of crossing lines. As illustrated, one line of each set of crossing lines at each side of the plate is further crossed by the other lines to enable a choice of places, within a narrow range, for the locations of the holes, it being understood that the holes in all plates of a series are to be drilled at the indices finally selected upon the first plate drilled.

The drilling apparatus illustrated includes a suitably supported foundation member 4 upon which the apparatus is mounted. This foundation carries a rectangular supporting bed 5 that is fixed thereupon and upon which the printing plates of a series are to be successively accurately positioned in exactly the same location for the drilling operations. After being accurately placed, each plate is held down upon the supporting bed by means of the flat presser feet 6 carried by and universally movable in sockets 7. These sockets have stems 8 carried by and movable crosswise of the arm 9. The springs 10 surround the stems and are interposed between the sockets 7 and the arm 9 pivoted upon the mounting 11 that is fixed upon the foundation member 4 and bed 5. The clamping feet 6 are pressed flat upon the printing plate that is to be held, when the unpivoted end of the arm 9 is held at or against the post 12. I have illustrated a depressing cam 13 carried by the mounting 11 and carrying an operating handle 14, the cam being engageable with a cam roller 15 provided upon the unmounted end of the arm 9. A spring 16 in post 12 presses upwardly against the arm to raise the arm and lift the presser feet when the cam is turned from its arm depressing position, to permit of the insertion, adjustment and removal of the plates that are to be drilled. The arm is desirably held in a raised position by the spring 16, the cam socket 17 receiving the roller 15 to define the extent to which the arm may be raised.

The plate supporting bed 5 carries an upright sleeve 18 whose unthreaded and smooth bore has sliding fit with the upright drill 19 the lower end of the sleeve being preferably flanged and the drill receiving lower end of its bore being flared to direct the drill into the sleeve. This sleeve is located midway between the presser feet, and the drill has a range of upright movement to form the hole through the printing plate. The drill is inserted within a chuck 20 driven by an electric motor 21. This motor is carried upon the upper end of an upright rack 22 which slides through an upright sleeve 23 which is clamped upon a post 24, depending from the bed 5, at any desired place along the post by means of a suitable clamp 25. A pinion 26, having an operating handle 27, is journaled within the clamp 23. By turning the pinion the drill may be raised while rotating to drill the printing plate and may be lowered to permit substitution of another printing plate in the place of the one drilled or a new adjustment of the latter for another drilling, the arm 9 being raised for this purpose after each drilling operation.

The bed 5 for supporting each printing plate that is to be drilled, the drill guide 18 upon this bed and the axis of the operating drill are in fixed relative positions so that when the printing plates of a series are exactly placed upon the bed 5, the holes in these plates will be located in exactly similar positions, insuring exact registry in the prints taken from these plates if the plates are exactly placed in the presses with the aid of exactly placed positioning pins received into the drilled holes. The mechanism 21, 22, 23, 26, for operating the drill normally has a predetermined fixed relationship with the drill guide 18.

The sighting device is desirably in the form of a microscope 27 including a tube formed in telescoping sections 28, 29, carrying the usual or suitable lenses 30, 31, 32.

The microscope tube section 29 is rigidly held upon the mounting 11' that is fixed upon the foundation member 4 and bed 5 whereby the microscope is held in fixed relation with the drill axis and drill guide. As illustrated in the drawing, the axis of the microscope is coincident, throughout, with the axis of the drill. A sighting index carrying glass disc 33 is carried within the tube section 28. When the selected index upon the printing plate is aligned with the common axis of the microscope and drill, Fig. 6, the plate is clamped in temporarily fixed relation with the drill axis and the drill is bodily moved to penetrate the plate, in the manner hitherto set forth. The sighting index upon the glass disc 33 is preferably defined by the intersections of two angularly related pairs of parallel lines ground in the disc. The printing plate is adjusted until the selected intersection of the indexing lines thereon is aligned with the geometrical center of the parallelogram formed by the intersecting lines upon the disc 33, these latter lines being so placed that such center is coincident with the common axis of the microscope and drill. The index upon disc 33 is magnified to the observer peering through the upper end of the microscope to facilitate the adjustment of the plate.

While the sighting device and the drill are illustrated as coaxial they may be otherwise arranged to make their axes coincident in the region of the plate supporting surface of the bed.

Changes may be made without departing from my invention.

Having thus described my invention, I claim:—

1. In a marking implement, the combination of a marking element and a microscopic gauge having a sighting index, means for supporting said microscopic gauge with its index located in the axis of the marking element, whereby an object positioned with an index thereon in registration with the index of the gauge will be located with its index in alinement with the marking element.

2. In an implement for positioning an object to be marked, the combination of an elongated guide for a marking element and a microscopic gauge having a sighting index, means for supporting said microscopic gauge with its index located in the axis of the guide, whereby an object positioned with an index thereon in registration with the index of the gauge will be located with its index in alinement with said guide.

3. In a marking implement the combination of a marking element and a transparent member bearing a sighting index, means for supporting said member with its index located in the axis of the marking element, whereby an object positioned with an index thereon in registration with the index of the transparent member will be located with its index in alinement with the marking element.

4. In an implement for positioning an object to be marked, the combination of an elongated guide for a marking element, and a transparent member bearing an index, means for supporting said member with its index located in the axis of the marking element, whereby an object positioned with an index thereon in registration with the index of the transparent member will be located with its index in alinement with the marking element.

In witness whereof, I hereunto subscribe my name.

HORACE W. HACKER.